Figure 6:
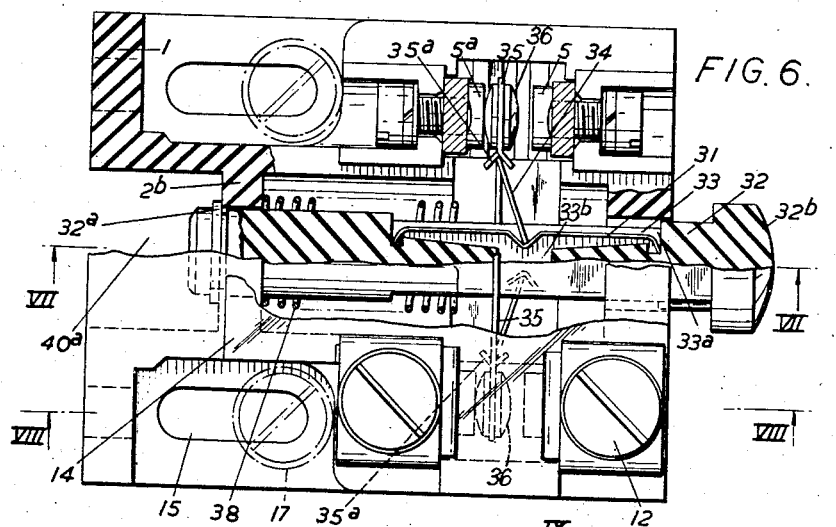

July 1, 1958
T. D. G. WINTLE
2,841,661
ELECTRIC LIMIT SWITCHES
Filed Nov. 19, 1953
6 Sheets-Sheet 1
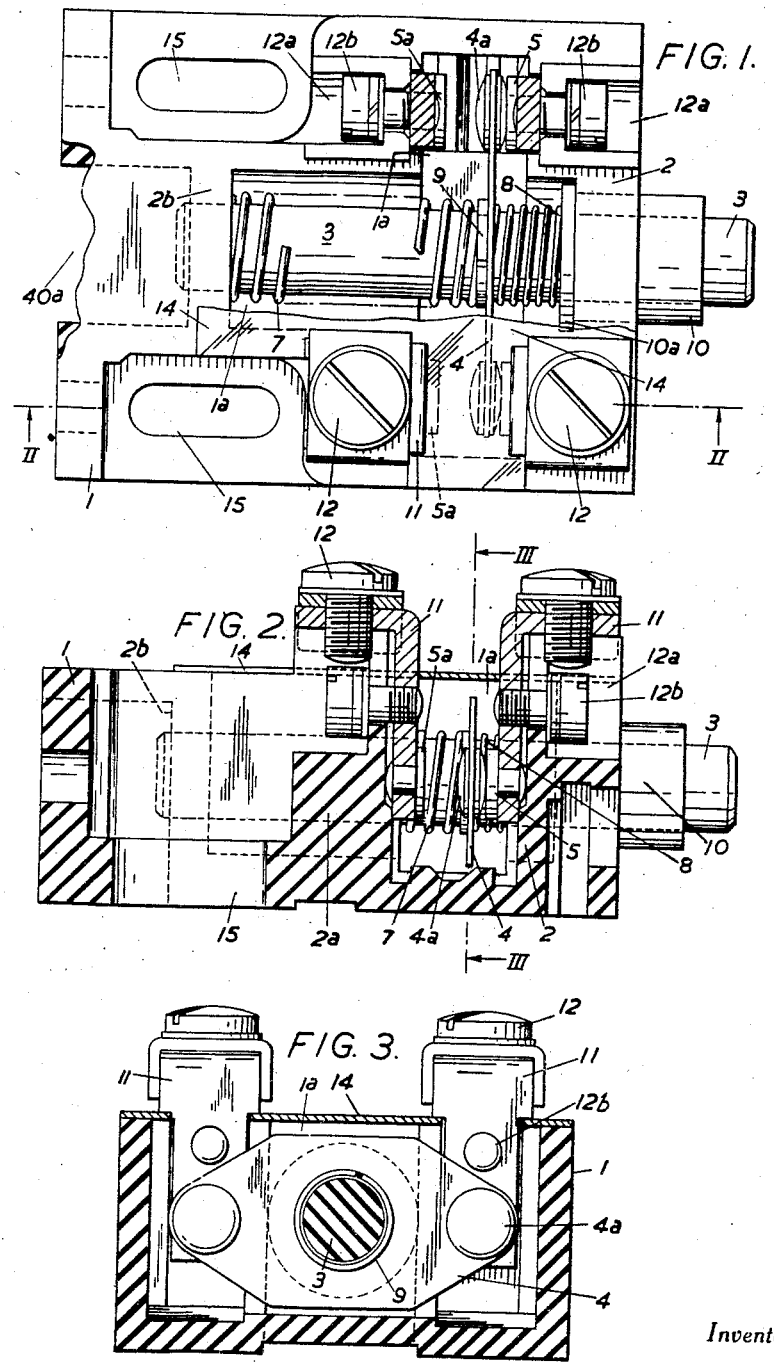
Inventor:—
Thomas D. G. Wintle,
By
Smith, Michael and Gardiner
Attorneys

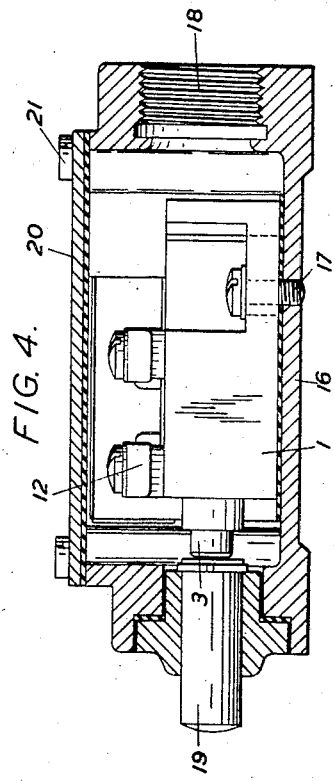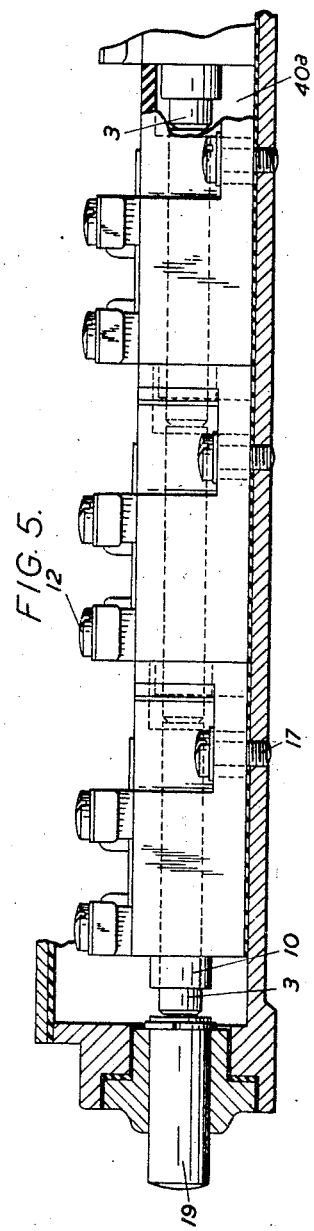

July 1, 1958     T. D. G. WINTLE     2,841,661
ELECTRIC LIMIT SWITCHES
Filed Nov. 19, 1953     6 Sheets-Sheet 3

Inventor:—
Thomas D. G. Wintle,
By Smith, Michael and Gardiner,
Attorneys.

July 1, 1958 T. D. G. WINTLE 2,841,661
ELECTRIC LIMIT SWITCHES
Filed Nov. 19, 1953 6 Sheets-Sheet 4

Inventor:-
Thomas D. G. Wintle.
By Smith, Michael and Gardner
Attorneys

July 1, 1958
T. D. G. WINTLE
2,841,661
ELECTRIC LIMIT SWITCHES
Filed Nov. 19, 1953
6 Sheets-Sheet 5
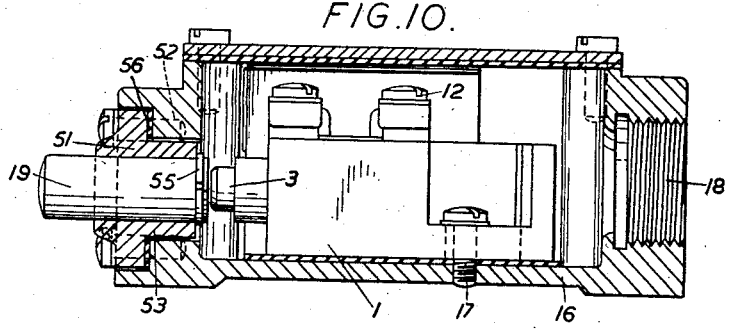
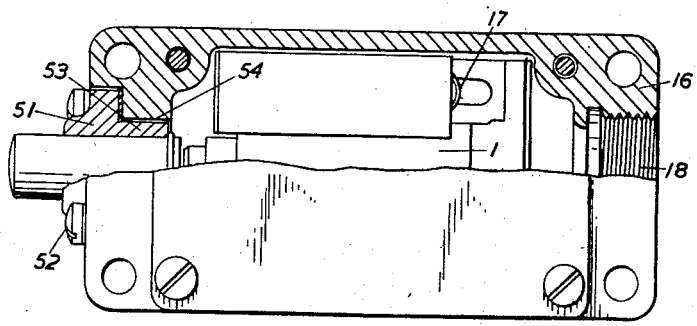
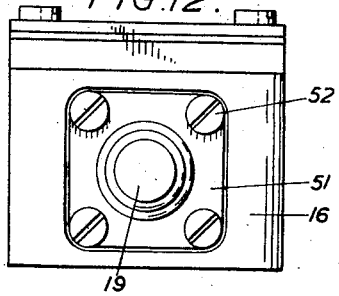
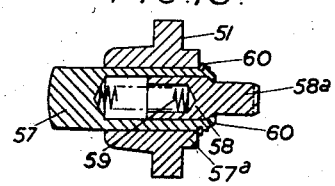
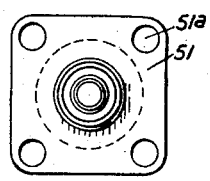
Inventor:-
Thomas D. G. Wintle,
Smith, Michael & Gardiner By
Attorneys.

July 1, 1958

T. D. G. WINTLE 2,841,661

ELECTRIC LIMIT SWITCHES

Filed Nov. 19, 1953

6 Sheets-Sheet 6

Inventor:-
Thomas D. G. Wintle,
By Smith, Michael and Gardiner,
Attorneys

United States Patent Office 2,841,661
Patented July 1, 1958

2,841,661
ELECTRIC LIMIT SWITCHES

Thomas Daniel Guy Wintle, Hall Green, Birmingham, England, assignor to J. A. Crabtree & Co. Limited, Walsall, England, a British company Application November 19, 1953, Serial No. 393,141

Claims priority, application Great Britain November 22, 1952

8 Claims. (Cl. 200—16)

This invention relates to improvements in electric limit switches, its object being to provide an improved arrangement of simple and economical construction requiring the employment of relatively few parts, while avoiding the possibility of interference with the moving parts of the mechanism by the cables, and providing a positive drive in the event of undesired welding of the contacts. A further object is to provide a unit adapted for mounting in casings, on site, or supplied with the unit, and capable of operation by different forms of drive. Another object is to enable any one of a variety of operating heads to be fitted at will to the switch casing.

According to this invention a plunger having a transversely disposed moving contact plate, co-operating with fixed contacts mounted on a base, is provided with a short slidable sleeve, adapted to act on the plate through the medium of a helical spring around the plunger, in order to provide a positive drive if the contacts should weld.

According to a further feature of the invention, the moving parts of the mechanism, comprising the plunger and moving contacts, together with the fixed contacts, are mounted in a well or recess in the base, while the terminals are disposed above the surface of the latter, a separating plate covering the well or recess, for preventing interference of the moving parts by the cables connected with such terminals.

A number of bases may be mounted in endwise disposition, with the projecting end of the operating plunger entered into a tunnel or recess in an adjacent base. The bases may be provided with feet having elongated slots so that each may be longitudinally adjusted thereon. Such arrangement enables the different plungers to constitute in effect a solid unit and the adjustment of the bases enables the opening and closing of the contacts of different switch units to be effected in varying sequences.

According to a further feature of the invention a snap-action electric limit switch comprises a moving contact plate actuated by links or toggle members on each side of a central push button spindle, each link or toggle member being pivotal at one end on the plate and at its other end on a resilient blade disposed parallel to, and laterally of, the spindle. Each blade may be formed with a hooked end and may be bent midway of its length for seating one end of a link or toggle member, the other end of which is seated in the moving contact plate. This plate may be formed with an opening for the passage of the spindle and opposed sides of which are formed with seatings for the outer ends of the links. The blades may be disposed in grooves in the spindle, said grooves being connected by a transverse opening adapted to permit inward flexing of the blades towards each other.

The invention also provides a common casing for receiving any one of a number of different operating heads so that an important economy in production costs is ensured. Each head may be formed with a portion adapted to be non-rotatably seated in a correspondingly shaped recess in an end wall of the switch casing or box, and apertured at each of its four corners for the passage of securing screws. The wall of the switch casing is formed with a central circular opening into which project a short circular boss or flange on the head. The actuating plunger projects through this boss or flange for actuating the switch mounted in the casing or box. A thin flexible waterproof washer may be disposed in the recess between the latter and the operating head.

Figure 8:
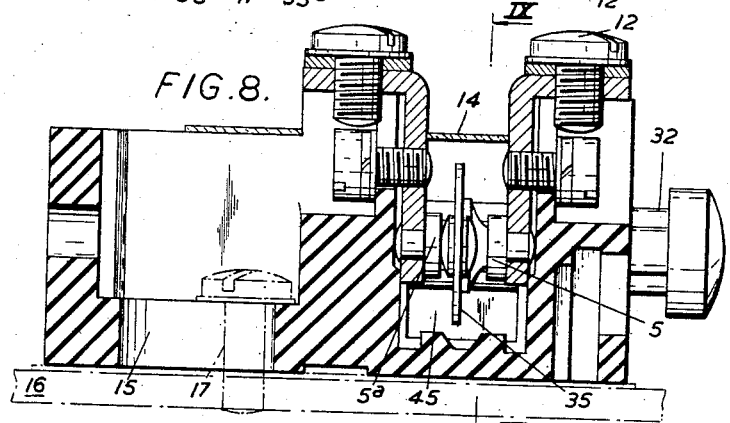
Figure 9:
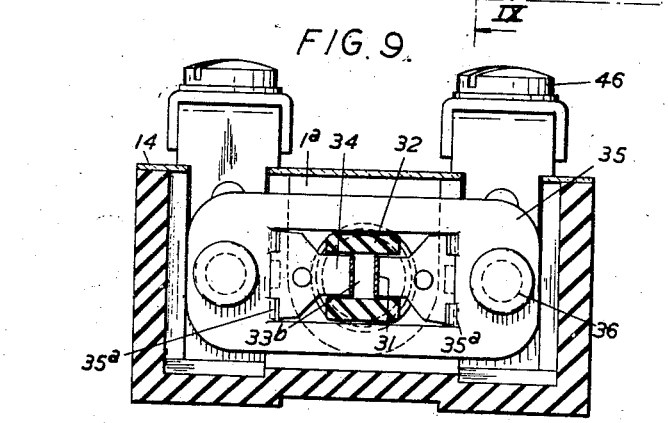
Figure 7:
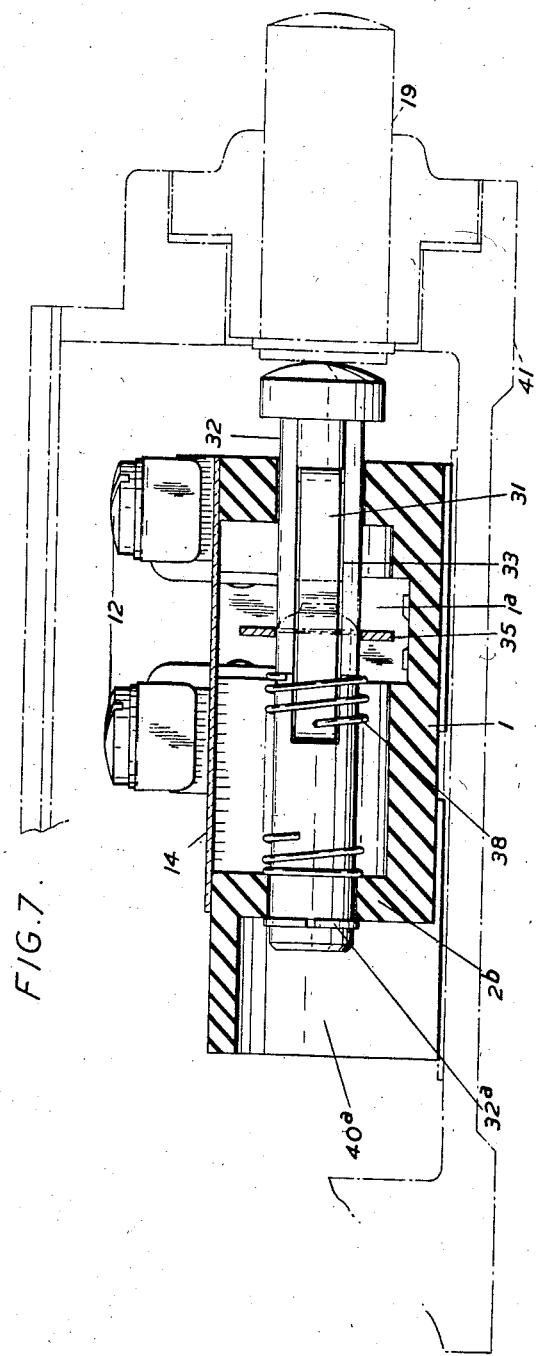
Figure 15:
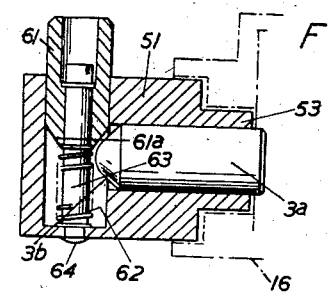
Figure 16:
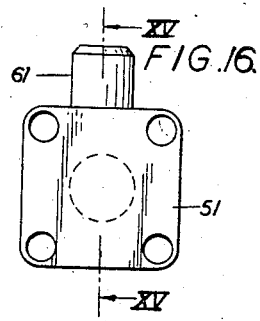
Figure 18:
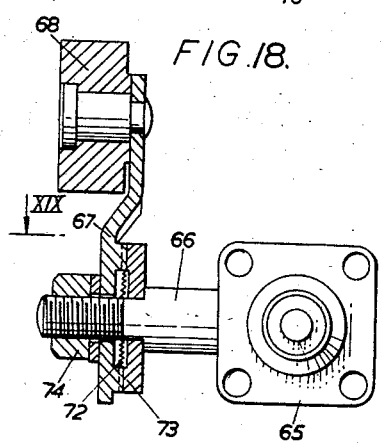
Figure 17:
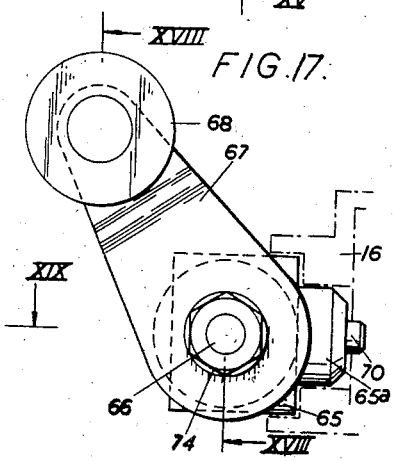
Figure 19:
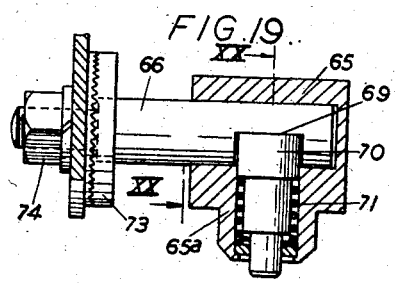
Figure 20:
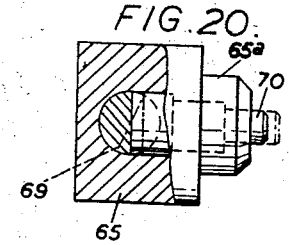
Figure 22:
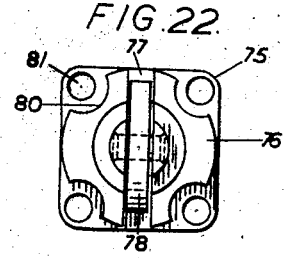
Figure 21:
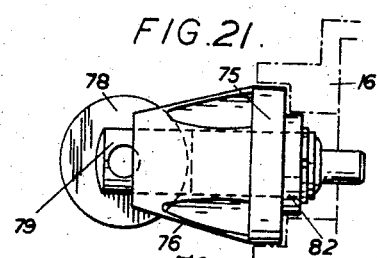

In order to enable the invention to be readily understood reference will now be made to the accompanying drawings illustrating by way of example different constructions for carrying the invention into effect, in which drawings:

Figure 1 is a plan with parts in section.
Figure 2 is a section on the line II—II of Figure 1.
Figure 3 is a section on the line III—III of Figure 2.
Figure 4 is a sectional elevation showing a switch, in accordance with these improvements, to a reduced scale, mounted in a box.
Figure 5 is a sectional elevation with parts broken away and illustrating a series of switches mounted in endwise disposition in a box.
Figure 6 is a plan with parts in section of a snap action switch.
Figure 7 is a section on the line VII—VII of Figure 6 showing the switch mounted in a box, a portion of which, together with the actuating plunger, is shown in chain lines.
Figure 8 is a section on the line VIII—VIII of Figure 6, the base of the box and a securing screw being shown in chain lines.
Figure 9 is a section on the line IX—IX of Figure 8.
Figures 10–22 illustrate a variety of operating heads embodying switch actuating means of different forms, Figure 10 being an elevation with parts in section of a limit switch mounted in a casing having one form of actuating means.
Figure 11 is a plan with parts in section of Figure 10.
Figure 12 is a front elevation of Figure 10.
Figure 13 is a sectional elevation of a modified construction of head and plunger.
Figure 14 is a rear view of Figure 13.
Figure 15 is a sectional elevation of another modified head a part of the casing being shown in chain lines, this figure being a section on the line XV—XV of Figure 16.
Figure 16 is a front elevation of the head shown in Figure 15.
Figure 17 is a side elevation of a further modification, a part of the casing being shown in chain lines.
Figure 18 is a section on the line XVIII—XVIII of Figure 17.
Figure 19 is a section on the line XIX—XIX of Figure 18.
Figure 20 is a section on the line XX—XX of Figure 19.
Figure 21 is a side elevation of yet another modification, a part of the casing being shown in chain lines and
Figure 22 is a front elevation of the head shown in Figure 21.

Referring to Figures 1 to 3 of the drawings, the rectangular base 1 made of insulating material is formed with a deep recess or well 1ª of T-shape in plan. The pairs of fixed contacts 5, 5ª, and the moving contacts 4ª on the ends of a plate 4, are disposed in the rectangularly shaped head of the recess 1ª, which is bounded at each end by the transverse walls 2, 2ᵇ formed with central holes for guiding a slidable plunger 3 made of insulating material. This rod extends freely through an opening in the transversely disposed plate 4, the moving contacts of which are in the form of silver buttons adapted for butt engagement with the fixed contacts. The terminal for each fixed contact comprises an L-shaped arm 11, one limb of which is tapped for receiving a terminal screw 12 while the other and longer arm depends into the head of the well 1ª and has a fixed contact 5, 5ª riveted thereto. Each terminal is secured in the base by a securing screw 12ᵇ which engages a tapped opening in the arm 11 and the head of which is disposed in a recess 12ª in the base.

A thin insulating plate 14 is disposed across the top of the well 1ª for the purpose of separating the terminal screws 12 from the contacts and associated parts. A helical compression spring is disposed around each end of the plunger 3 between the contact plate 4 and each end wall 2, 2ᵇ, of the base. The longer and stronger spring 7 at the rear end of the switch acts on a split ring 9 fixed to the plunger, and normally acts, by virtue of its abutment at one end against the wall 2ᵇ, for pressing the ring 9 against the plate 4 so that the latter is engaged with the fixed contacts 5, as shown in the drawings. The forward end of the plunger 3 normally projects from the front of the base. In this position, as shown in the drawings, the shorter spring 8, is maintained in compression and almost solid between the plate 4 and a short insulating sleeve 10 disposed freely around the plunger and within the guiding opening in the wall 2. This sleeve is formed at its rear end with a peripheral flange 10ª against which the spring 8 is seated and which also serves for abutment against the rear surface of the wall 2.

In normal operation the plunger 3 is forced rearwardly against the action of the longer spring 7 until the contact plate 4 engages the rear fixed contacts 5ª. During this movement the plunger causes its split ring 9 to compress the longer spring, so that the shorter spring 8 is then enabled to exert compressive force on the plate 4 for maintaining pressure engagement of the contacts 4ª with the rear fixed contacts 5ª. On release of the actuating means the compressive force of the longer spring 7 returns the parts to the original position as shown in the drawings.

In the event of the contacts 5 welding with those on the contact plate 4, the initial movement causes the plunger 3 to move within the sleeve 10, until the actuating means engages with the outer end of the latter. Movement of the sleeve then causes the short spring 8 to become solid and thereby transmit a positive drive for separating the welded contacts.

The base may be formed at its rear end with feet, each having an elongated opening or slot 15 to enable the unit to be movable endwise over securing screws 17 (Figures 4 and 5) extending therethrough. Between these feet the base is formed of tunnel shape 40ª so that when a series of switches is mounted in endwise disposition as shown in Figure 5, the forward end of the plunger of one switch is disposed in the tunnel of an adjacent switch, for abutment against the rear end of the plunger of such switch. The arrangement as shown in Figure 5, results in what is in effect a number of plungers constituting an almost continuous solid rod the adjustability of the bases enabling sequential operation of the contacts of different units as hereinbefore described.

Alternatively each switch unit may be mounted in a metal box 16 as shown in Figure 4, the switch having elongated slots as described with reference to Figure 1, in order to permit of its adjustable endwise mounting over the securing screws 17. A conduit entry 18 is formed in the end wall of the box and a bushed opening in its front wall serves for the mounting of a slidable metal plunger 19 adapted for impingement on the plunger 3 of the switch unit. The box may be provided with a cover plate 20 secured to the base of the box 16 by means of screws 21. The switches in Figure 5 may be mounted in a similarly constructed box.

In the snap-action type of switch illustrated in Figures 6, 7, 8 and 9, of the drawings, a central push button spindle or operating plunger 32 is formed on opposite sides with longitudinal grooves 33 in each of which is a resilient blade 31 disposed parallel to the plunger. Each blade is formed with a hooked end engaging in a recess 33ª at the end of each groove, and is bent midway of its length to form an inwardly disposed notch for seating the inner end of a link or toggle member 34, the other end of which is seated in a notch or V-formation provided on a flat plate or contact member 35, at each extremity of which is a moving contact button 36 co-operating with fixed contacts or stops 5, 5ª, disposed on each side of said plate. As will be seen from Figure 9, the contact plate is of rectangular shape and is formed with a similarly shaped opening through which extends the operating plunger 32. The sides of this opening are formed with bent-out portions 35ª to form forked or V-shaped seatings for the outer ends of the blades 34. These blades are of somewhat triangular shape the inner opposed ends being seated in the V-shaped notches in the blades 31. The grooves in the plunger are connected by a central opening 33ᵇ affording a space to enable the blades 31 to flex towards each other.

Normally the resilient blades 31 act for urging the links outwards, into the position shown in Figure 6, so that the hooked ends thereof are pressed against the outer ends of the recesses 33ª, the links 34 then being disposed in an inclined position to the right of the plate 35, with the moving contacts 36 engaging the fixed contacts 5ª. When the plunger 32 is pressed inwards against the action of a helical spring 38, which acts between an abutment on the plunger and a wall 2ᵇ of the insulating base 1, the resilient blades 31 carried by the plunger, cause the inner ends of the links or toggle member 34 to approach each other by pivotal action about their outer ends. When the dead centre position is passed, that is when these inner ends are forced to the left of the plate 35, the resilient blades 31 cause the latter to fly to the right with a snap action, so that the moving contacts 36 are then disengaged from the contacts 5ª and brought into engagement with the contacts 5. When the push button or plunger 32 is released, the parts are returned by the spring 38, to the position shown in Figure 6.

As shown in Figure 7 the rear end of the plunger 32 is grooved to receive a split ring 32ª which abuts against the outer end of a wall 2ᵇ in order to limit the outward movement of the plunger. This end of the plunger extends into a central tunnel-like recess 40ª into which can be introduced the head 32ᵇ of another switch, so as to be operated by the inner end of an adjacent switch as previously described. The switch may be mounted in a box or casing 16 as described with reference to Figure 4.

The form of operating head shown in Figures 10, 11 and 12, comprises a front portion 51 which is of externally rectangular shape for reception in a correspondingly shaped recess in an end wall of the box and which is formed with openings at each of its four corners for the passage of screws 52 which secure the head to the box. Inwardly extending from this rectangular portion is a sleeve-like boss 53 which is received in a circular opening 54 in the end wall of the box. The outer end of the plunger 19 projects beyond the head so as to be actuated by the moving part of the machine. Its inner end is grooved and provided with a split ring 55 which impinges on the boss for limiting outward movement of the plunger. A washer 56 is interposed between the box and the head.

According to the modified construction shown in Figures 13 and 14, the head, which is adapted to be fitted into the box, Figure 10 is formed with a rectangular portion 51 apertured at 51ª for the securing screws and having a short circular boss 57ª for seating in the circular opening in the end wall of the box. This modification incorporates an overrun device comprising a plunger 57 having a hollowed portion in which is disposed a second plunger 58 of reduced diameter having a stem 58ª adapted to engage the slidable rod 3 of the switch. A helical compression spring 59 is disposed between the two plungers and forward movement of the arrangement is limited by the abutment of a ring 60 on the outer plunger against the inner surface of the head as seen in Figure 13. The two plungers are maintained compressively expanded, as shown by pressing or spinning a flange 60 on the outer plunger into engagement with the smaller plunger.

According to Figures 15 and 16, the head, having a rectangular portion 51 and a circular boss 53 for fitting into the box 16, Figure 10, is of extended length in order to accommodate a tubular member 61 disposed at right angles to the plunger 3ª and slidable, against the action of a spring 62 disposed around a pin 63 over which the member 61 is slidable and which is secured to the head by riveting or the like 64. The tubular member 61 has a coned end 61ª adapted to impinge on the coned or rounded end 3ᵇ of the plunger for the purpose of actuating the switch.

According to Figures 17-20, extending from a cube-like block or head 65 is an oscillating spindle 66 on the outer end of which is a crank arm 67 provided with a roller 68 operable by the machine or moving part. The inner end of the spindle within the head is formed with a cut-away flattened portion 69 adapted when turned to press a plunger 70 outwardly from the head against the action of a spring 71. This plunger is adapted to engage with a rod on the switch with the parts in the position shown in broken lines, Figure 20, for actuating the switch. The head 65 is of rectangular configuration and has a circular boss 65ª thereon which fits into the the end wall of the box as previously described. Angular adjustment of the arm 67 may be provided in known manner by the provision thereon of face teeth 72 engageable with a toothed ring 73, the parts being tightened into driving engagement, after adjustment, by a nut 74 on the end of the spindle 66.

According to the modified construction shown in Figures 21 and 22, the head 75 is formed on its outer surface with a pair of sleeves 76 which are spaced to provide between them a guide or channel 77 for the sliding movement of a roller 78 revolubly mounted on the end of the plunger 79. The sleeves produce a somewhat conical shape externally as seen in Figure 21 and are grooved at 80 for the passage of securing screws through the openings 81. A short boss or sleeve 82 extends into the circular opening in the box. If desired an overrun device of the kind shown in Figure 13 may be combined with this modification.

Instead of mounting the heads or blocks on the switch casing, they may be installed directly on a machine adapted for the reception of a switch, the wall of the machine being recessed for mounting the head and its boss, and bored for the passage of the actuating plunger.

While there have been shown and described and pointed out the fundamental novel features of the invention as applied to preferred embodiments thereof, it will be understood that various omissions and substitutions and changes in the form and details of the devices illustrated may be made by those skilled in the art, without departing from the spirit of the invention. It is the intention, therefore, to be limited only as indicated by the scope of the claims appended hereto.

Having thus described my invention, I claim:

1. An electric limit switch comprising an insulating base, fixed contacts secured to said base, a plunger slidable axially thereof in said base with one end extending outwardly of said base for contact with a member which actuates the limit switch, a movable contact plate carried by said plunger transversely thereof and disposed for cooperation with said fixed contacts, a short sleeve slidably mounted upon said plunger and slidably extending through said base to a point rearwardly of the outer end of said plunger, and, a helical spring surrounding said plunger between said contact and the inner end of said sleeve, whereby the member which actuates the switch first contacts the outer end of said plunger to move said contact plate from said fixed contacts, and whereby upon failure of said plunger to move said contact plate from said fixed contacts the member which actuates the switch continues its movement to press upon the outer end of said sleeve, to compress said helical spring to become solid and thereby to transmit a positive force to said contact plate to separate it from said fixed contacts.

2. A plurality of electric limit switches according to claim 1 disposed in endwise series, the forward outwardly extending end of the plunger of each switch extending into a tunnel in the insulating base in position to be contacted by the rearward end of an adjacent switch.

3. An electric limit switch according to claim 1 wherein a member is fixed to said plunger for normally pressing against said movable contact plate on its side opposite to that upon which said helical spring is disposed, a second helical spring longer and stronger than said first-named spring surrounding said plunger between an abutment in said base and said member for normally pressing said member against said contact plate and compressing said first-named spring between said plate and said short sleeve.

4. An electric limit switch comprising a base having a transversely disposed well or recess therein, fixed contacts, a plunger and a contact plate provided with movable contacts thereon disposed within said recess, terminals of said switch disposed without said recess, conductors connected to said terminals, an insulating cover separating said recess from said terminals to prevent interference with the moving parts of said switch by said conductors and a solidly compressible helical spring adapted to exert a positive force to separate said contact plate from said fixed contacts.

5. An electric limit switch according to claim 4, wherein said plunger is provided with a longitudinal groove therein, a notched co-axial blade engaging said groove, said blade being constructed and arranged to pivotally seat one end of said toggle member.

6. An electric limit switch according to claim 5 wherein said contact plate is forked to pivotally seat the other end of said toggle member therein.

7. An electric limit switch according to claim 5 having a plurality of said fixed and movable contacts positively activated by a plurality of said toggle members pivotally disposed between a plurality of said blades and said contact plates for snap action in alternate directions within said well or recess in said base.

8. An electric limit switch comprising a casing, a plurality of operating heads embodying variant switch-actuating means, each of said operating heads being non-rotatably interchangeably fitted to said casing, a rectangularly shaped recess and a circular opening provided in said casing, each of said operating heads being formed with a rectangular portion adapted to be seated in said recess, means for securing said portion, said portion having a short circular boss projecting into said circular opening, and a plunger projecting through said boss for actuating said switch.

References Cited in the file of this patent

UNITED STATES PATENTS

| | | |
|---|---|---|
| 2,332,911 | Hausler | Oct. 26, 1943 |
| 2,549,794 | Frank | Apr. 24, 1951 |
| 2,562,420 | Furnas | July 31, 1951 |